(12) United States Patent
Yukimasa et al.

(10) Patent No.: US 9,791,154 B2
(45) Date of Patent: Oct. 17, 2017

(54) POWER GENERATION SYSTEM AND METHOD OF OPERATING POWER GENERATION SYSTEM

(71) Applicant: PANASONIC INTELLECTUAL PROPERTY MANAGEMENT CO., LTD., Osaka (JP)

(72) Inventors: Akinori Yukimasa, Osaka (JP); Hiroshi Tatsui, Shiga (JP); Kiyoshi Taguchi, Osaka (JP); Shigeru Iiyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 78 days.

(21) Appl. No.: 14/646,729

(22) PCT Filed: May 30, 2014

(86) PCT No.: PCT/JP2014/002870
§ 371 (c)(1),
(2) Date: May 21, 2015

(87) PCT Pub. No.: WO2014/203469
PCT Pub. Date: Dec. 24, 2014

(65) Prior Publication Data
US 2015/0308689 A1  Oct. 29, 2015

(30) Foreign Application Priority Data
Jun. 18, 2013 (JP) .................................. 2013-127708

(51) Int. Cl.
*F23R 3/28* (2006.01)
*F23N 5/00* (2006.01)
(Continued)

(52) U.S. Cl.
CPC .................. *F23R 3/28* (2013.01); *C01B 3/34* (2013.01); *F23N 5/003* (2013.01); *F23N 5/022* (2013.01);
(Continued)

(58) Field of Classification Search
CPC . F23R 3/28; F23N 5/003; F23N 5/022; F23N 5/242; F23N 2025/10; C01B 3/34;
(Continued)

(56) References Cited

U.S. PATENT DOCUMENTS 4,492,079 A * 1/1985 Takagi .................... F01N 3/023
55/283
5,158,448 A * 10/1992 Kawasaki ............... F23C 13/00
431/328
(Continued)

FOREIGN PATENT DOCUMENTS

EP        1840996 A1   10/2007
JP     H01-137114 A    5/1989
(Continued)

OTHER PUBLICATIONS

International Search Report issued in International Publication No. PCT/JP2014/002870 dated Sep. 2, 2014, with English Translation.
(Continued)

*Primary Examiner* — Peter Helvey
(74) *Attorney, Agent, or Firm* — McDermott Will & Emery LLP

(57) ABSTRACT

A power generation system includes: a combustor operative to combust a fuel; a power generator operative to utilize energy obtained from the combustor when generating electric power; a fuel supplier operative to supply the fuel to the combustor; an air supplier operative to supply combustion air to the combustor; a discharged gas passage through which a discharged gas from the combustor flows; a CO (Continued)

detector operative to detect CO in the discharged gas; a temperature detector operative to detect a temperature of the discharged gas; and control circuitry operative to, when the discharged gas is flowing through the discharged gas passage, perform at least one of an operation of detecting a structural abnormality of the discharged gas passage based on a difference between detected temperatures of the temperature detector relative to a difference between heated amounts of the discharged gas heated by a heater and an operation of detecting the structural abnormality of the discharged gas passage based on the difference between the detected temperatures of the temperature detector relative to a difference between outputs of at least one of the fuel supplier and the air supplier.

16 Claims, 10 Drawing Sheets

(51) Int. Cl.

| | | |
|---|---|---|
| F23N 5/02 | (2006.01) | |
| F23N 5/24 | (2006.01) | |
| C01B 3/34 | (2006.01) | |
| H01M 8/0612 | (2016.01) | |
| H01M 8/0662 | (2016.01) | |
| H01M 8/04014 | (2016.01) | |
| H01M 8/0432 | (2016.01) | |
| H01M 8/0444 | (2016.01) | |
| H01M 8/04664 | (2016.01) | |

(52) U.S. Cl.
CPC ........ *F23N 5/242* (2013.01); *H01M 8/04022* (2013.01); *H01M 8/0444* (2013.01); *H01M 8/04373* (2013.01); *H01M 8/04686* (2013.01); *H01M 8/0618* (2013.01); *H01M 8/0662* (2013.01); *C01B 2203/025* (2013.01); *C01B 2203/0233* (2013.01); *C01B 2203/0244* (2013.01); *C01B 2203/0822* (2013.01); *C01B 2203/1288* (2013.01); *F23N 2025/10* (2013.01); *Y02E 60/50* (2013.01); *Y02P 20/128* (2015.11)

(58) Field of Classification Search
CPC ........ C01B 2025/10; C01B 2203/0233; C01B 2203/0244; C01B 2203/0285; C01B 2203/0822; C01B 2203/1288; H01M 8/0618; H01M 8/0662; H01M 8/04022; H01M 8/04373; H01M 8/0444; H01M 8/04686; Y02P 20/128; Y02E 60/50
USPC .............................................. 60/772, 39.27
See application file for complete search history.

(56) References Cited

U.S. PATENT DOCUMENTS

| | | | | |
|---|---|---|---|---|
| 5,828,582 A | * | 10/1998 | Conklen | B01D 53/30 700/274 |
| 6,095,793 A | * | 8/2000 | Greeb | F02C 9/28 431/11 |
| 6,280,180 B1 | * | 8/2001 | Fredin-Garcia-Jurado | F23N 5/123 126/39 E |
| 6,318,074 B1 | * | 11/2001 | Nishimura | F02D 41/024 60/284 |
| 6,612,105 B1 | * | 9/2003 | Voigt | F03H 1/0012 313/362.1 |
| 6,641,625 B1 | * | 11/2003 | Clawson | B01J 8/0419 422/187 |
| 2002/0056316 A1 | * | 5/2002 | Tachihara | F02M 31/08 431/5 |
| 2002/0081470 A1 | * | 6/2002 | Hanai | C01B 3/382 236/15 E |
| 2005/0037302 A1 | * | 2/2005 | Schonert | B01J 8/0221 431/11 |
| 2005/0170226 A1 | * | 8/2005 | Kralick | H01M 8/04223 73/23.2 |
| 2008/0113306 A1 | | 5/2008 | Veasey et al. | |
| 2011/0197572 A1 | * | 8/2011 | Chang | F01N 1/166 60/324 |
| 2013/0189599 A1 | | 7/2013 | Tatsui et al. | |

FOREIGN PATENT DOCUMENTS

| | | |
|---|---|---|
| JP | 02-54123 A | 2/1990 |
| JP | 11-241820 A | 9/1999 |
| JP | 2003-329241 A | 11/2003 |
| JP | 2004-069436 A | 3/2004 |
| JP | 2006-213566 A | 8/2006 |
| JP | 2012-159274 A | 8/2012 |

OTHER PUBLICATIONS

Extended European Search Report dated Jun. 28, 2016 issued in European Application No. 14812975.2.

* cited by examiner

POWER GENERATION SYSTEM AND METHOD OF OPERATING POWER GENERATION SYSTEM

RELATED APPLICATIONS

This application is a national phase of International Application No. PCT/JP2014/002870, filed on May 30, 2014, which in turn claims the benefit of Japanese Application No. 2013-127708, filed on Jun. 18, 2013 the disclosures of which Applications are incorporated by reference herein.

TECHNICAL FIELD

The present invention relates to a power generation system and a method of operating the power generation system.

BACKGROUND ART

Since an infrastructure for supplying hydrogen has not been developed, a system, such as a fuel cell system, which uses the hydrogen as a fuel is normally provided with a reformer. In addition, the fuel cell system is provided with a combustor configured to heat the reformer.

Proposed is a fuel cell system in which a CO detector is disposed on an exhaust duct of the combustor such that carbon monoxide (CO) generated by, for example, incomplete combustion of the combustor can be detected (see PTL 1, for example). PTL 1 discloses a technology in which a water discharge portion disposed on the exhaust duct discharges dew condensation water in the exhaust duct to prevent the CO detector from being immersed in the dew condensation water.

CITATION LIST

Patent Literature

PTL 1: Japanese Laid-Open Patent Application Publication No. 2006-213566

SUMMARY OF INVENTION

Technical Problem

However, PTL 1 does not sufficiently discuss structural abnormalities of a discharged gas passage in the case of detecting the CO in the discharged gas.

One aspect of the present invention was made under these circumstances, and an object of the present invention is to provide a power generation system and a method of operating the power generation system, each of which can deal more appropriately with the structural abnormalities of the discharged gas passage in the case of detecting the CO in the discharged gas, than conventional cases.

Solution to Problem

A power generation system according to one aspect of the present invention includes: a combustor operative to combust a fuel; a power generator operative to utilize energy obtained from the combustor when generating electric power; a fuel supplier operative to supply the fuel to the combustor; an air supplier operative to supply combustion air to the combustor; a discharged gas passage through which a discharged gas from the combustor flows; a CO detector operative to detect CO in the discharged gas; a temperature detector operative to detect a temperature of the discharged gas; and control circuitry operative to, when the discharged gas is flowing through the discharged gas passage, perform at least one of an operation of detecting an abnormality of the discharged gas passage based on a difference between detected temperatures of the temperature detector relative to a difference between heated amounts of the discharged gas heated by a heater and an operation of detecting the abnormality of the discharged gas passage based on the difference between the detected temperatures of the temperature detector relative to a difference between outputs of at least one of the fuel supplier and the air supplier.

A method of operating a power generation system according to one aspect of the present invention includes: combusting a fuel by a combustor; utilizing energy obtained by the combustor to generate electric power by a power generator; and when a discharged gas is flowing from the combustor through a discharged gas passage, performing at least one of an operation of detecting an abnormality of the discharged gas passage based on a difference between detected temperatures of a temperature detector relative to a difference between heated amounts of the discharged gas heated by a heater and an operation of detecting the abnormality of the discharged gas passage based on the difference between the detected temperatures of the temperature detector relative to a difference between outputs of at least one of a fuel supplier and an air supplier.

Advantageous Effects of Invention

Each of the power generation system and the method of operating the power generation system according to one aspect of the present invention can deal more appropriately with the structural abnormalities of the discharged gas passage in the case of detecting the CO in the discharged gas, than conventional cases.

DESCRIPTION OF EMBODIMENTS

Embodiment 1

Figure 1:
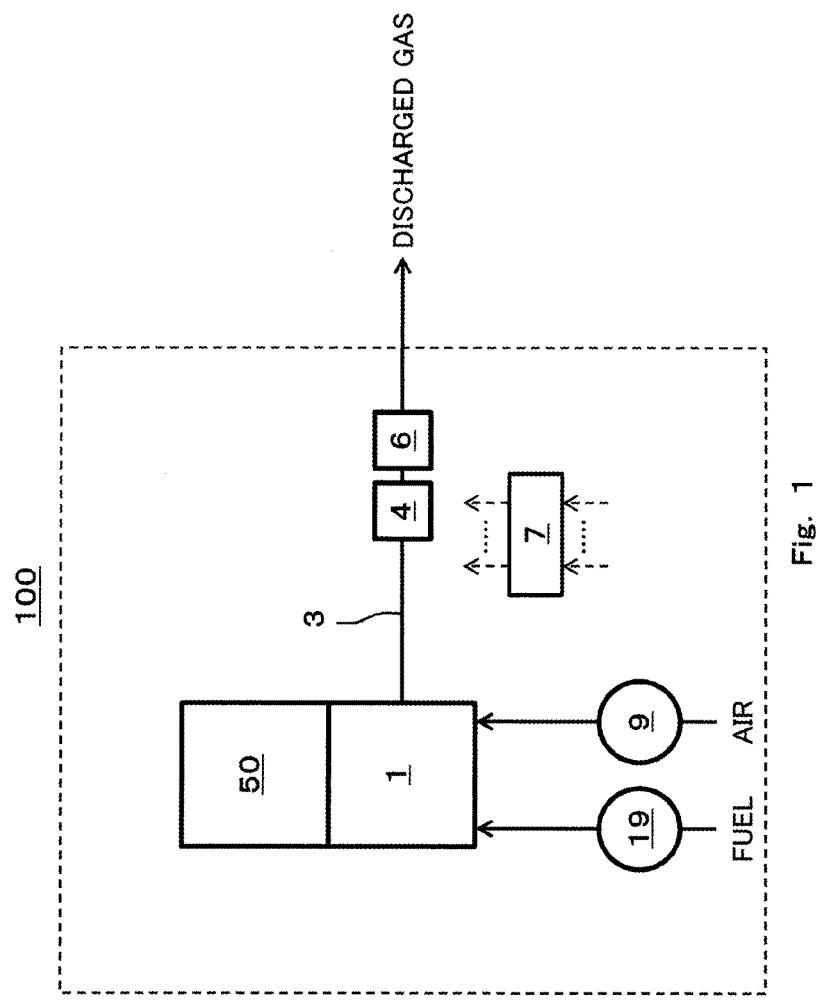
FIG. 1 is a diagram showing one example of a power generation system according to Embodiment 1.

The present inventors have diligently studied a relation between a structural abnormality of a discharged gas passage and CO detection by a CO detector. As a result, the present inventors have obtained the following findings.

For example, in a case where a discharged gas leaks from the discharged gas passage by the structural abnormality, such as break or come-off of the discharged gas passage, the CO detection by the CO detector is hindered. In addition, in a case where the flow of the discharged gas in the discharged gas passage is blocked by the structural abnormality, such as clogging of the discharged gas passage, the CO detection by the CO detector is hindered. In these cases, CO generated by, for example, incomplete combustion of the combustor may not be detected by the CO detector.

A power generation system according to Embodiment 1 includes: a combustor operative to combust a fuel; a power generator operative to utilize energy obtained from the combustor when generating electric power; a fuel supplier operative to supply the fuel to the combustor; an air supplier operative to supply combustion air to the combustor; a discharged gas passage through which a discharged gas from the combustor flows; a CO detector operative to detect CO in the discharged gas; a temperature detector operative to detect a temperature of the discharged gas; and control circuitry operative to, when the discharged gas is flowing through the discharged gas passage, perform at least one of an operation of detecting an abnormality of the discharged gas passage based on a difference between detected temperatures of the temperature detector relative to a difference between heated amounts of the discharged gas heated by a heater and an operation of detecting the abnormality of the discharged gas passage based on the difference between the detected temperatures of the temperature detector relative to a difference between outputs of at least one of the fuel supplier and the air supplier.

A method of operating a power generation system according to Embodiment 1 includes: combusting a fuel by a combustor; utilizing energy obtained by the combustor to generate electric power by a power generator; and when a discharged gas is flowing from the combustor through a discharged gas passage, performing at least one of an operation of detecting an abnormality of the discharged gas passage based on a difference between detected temperatures of a temperature detector relative to a difference between heated amounts of the discharged gas heated by a heater and an operation of detecting the abnormality of the discharged gas passage based on the difference between the detected temperatures of the temperature detector relative to a difference between outputs of at least one of a fuel supplier and an air supplier.

With this, each of the power generation system and the method of operating the power generation system can deal more appropriately with the structural abnormalities of the discharged gas passage in the case of detecting the CO in the discharged gas, than conventional cases. For example, in a case where the structural abnormality, such as the break, come-off, or clogging of the discharged gas passage, exists, the possibility that the discharged gas cannot reach the temperature detector and the CO detector is high. Here, the temperature detector is heated by potential heat of the discharged gas. By changing the heated amount of the discharged gas heated by the heater, the difference between the detected temperatures of the temperature detector in a case where the abnormality of the discharged gas passage exists and the difference between the detected temperatures of the temperature detector in a case where the abnormality of the discharged gas passage does not exist become different from each other. In addition, by changing the output of at least one of the fuel supplier and the air supplier, the flow rate of the discharged gas changes, so that the difference between the detected temperatures of the temperature detector in a case where the abnormality of the discharged gas passage exists and the difference between the detected temperatures of the temperature detector in a case where the abnormality of the discharged gas passage does not exist become different from each other. Therefore, the abnormality of the discharged gas passage can be detected based on the detected temperatures of the temperature detector. Thus, a state where the CO detection is hindered can be appropriately known.

Device Configuration

FIG. 1 is a diagram showing one example of the power generation system according to Embodiment 1.

In the example shown in FIG. 1, a power generation system 100 according to the present embodiment includes a combustor 1, a power generator 50, a discharged gas passage 3, a CO detector 4, a temperature detector 6, control circuitry 7, a fuel supplier 19, and an air supplier 9.

The combustor 1 combusts a fuel. The fuel supplier 19 supplies the fuel to the combustor 1. The air supplier 9 supplies combustion air to the combustor 1. To be specific, the fuel from the fuel supplier 19 and the air from the air supplier 9 are supplied to the combustor 1. With this, the air from the air supplier 9 and the fuel from the fuel supplier 19 are combusted by the combustor 1.

When generating electric power, the power generator 50 utilizes energy obtained from the combustor 1.

The power generation system 100 may be a fuel cell system or a gas engine power generation system.

Therefore, in a case where the power generator 50 of the power generation system 100 is a fuel cell unit, the combustor 1 of FIG. 1 is a combustion burner configured to combust an anode discharged gas of a fuel cell. The energy obtained from the combustor 1 is heat energy, and the heat energy is used to generate a hydrogen-containing gas utilized when generating the electric power.

In a case where the power generator 50 of the power generation system 100 is a gas engine power generator, the combustor 1 of FIG. 1 is an engine. The energy obtained from the combustor 1 is kinetic energy, and the kinetic energy is used to operate an electric generator.

The fuel of the combustor 1 may be any fuel. Examples of the fuel include: a hydrocarbon gas, such as a city gas containing methane as a major component, a natural gas, and a LPG; and a hydrogen-containing gas. The combustor 1 may have any configuration as long as it can combust the fuel. For example, in a case where the combustion burner is used as the combustor 1, the combustor 1 may be a premix combustion burner to which a mixture obtained by premixing the fuel and the air at an outside is supplied or a diffusion combustion burner in which the fuel and the air separately supplied is mixed.

The air supplier 9 may have any configuration as long as it can supply the air to the combustor 1. Examples of the air supplier 9 include a fan and a blower. When adjusting the flow rate of the air supplied to the combustor 1, the flow rate of the air that is the output of the air supplier 9 may be changed by increasing or decreasing the electric power supplied to the air supplier 9, or the flow rate of the air may be changed by using a flow rate control valve or the like.

The fuel supplier 19 may have any configuration as long as it can supply the fuel to the combustor 1. One example of the fuel supplier 19 is a pump. When adjusting the flow rate of the fuel supplied to the combustor 1, the flow rate of the fuel that is the output of the fuel supplier 19 may be changed by increasing or decreasing the electric power supplied to the fuel supplier 19, or the flow rate of the fuel may be changed by a flow rate control valve or the like.

The discharged gas passage 3 is a passage through which the discharged gas form the combustor 1 flows. The discharged gas passage 3 is connected to the combustor 1, and the discharged gas from the combustor 1 flows through the discharged gas passage 3 to be discharged to the atmosphere outside the power generation system 100. For example, while the combustor 1 is combusting the fuel, a flue gas may flow as the discharged gas through the discharged gas passage 3. In a case where the combustor 1 stops combusting the fuel, the air from the air supplier 9, the fuel from the fuel supplier 19, or the mixture of the air and the fuel may flow as the discharged gas through the discharged gas passage 3.

The CO detector 4 detects the CO in the discharged gas. In the present embodiment, the CO detector 4 is disposed on the discharged gas passage 3. With this, the CO in the discharged gas generated by, for example, the incomplete combustion of the combustor 1 is detected by using the CO detector 4. The CO detector 4 may have any configuration as long as it can detect the CO in the discharged gas. For example, the CO detector 4 may be a contact combustion type CO detector or a semiconductor type CO detector. One example of the semiconductor type CO detector is a CO gas sensor configured to detect the CO in the discharged gas by using a sintered body of an n-type semiconductor oxide, such as a tin oxide, sensitized by adding a minute amount of metallic element, such as precious metal, and by utilizing a property in which electric conductivity of the semiconductor changes when the semiconductor contacts the discharged gas. One example of the contact combustion type CO detector is a CO gas sensor configured to detect a difference between heat generations of a pair of comparison elements each of which is heated to a certain temperature and at each of which a catalytic oxidation reaction is caused by contact with the discharged gas, the pair of comparison elements including an element prepared such that a platinum fine wire to which supports are attached supports precious metal and an element prepared such that a platinum fine wire to which supports are attached does not support precious metal.

The temperature detector 6 detects the temperature of the discharged gas. In the present embodiment, the temperature detector 6 is disposed on the discharged gas passage 3. The temperature detector 6 may have any configuration as long as it can directly or indirectly detect the temperature of the discharged gas. To be specific, the temperature of the discharged gas may be directly detected by the temperature detector 6 provided in the discharged gas passage 3 or may be indirectly detected by the temperature detector 6 provided a predetermined portion (for example, a surface of a pipe forming the discharged gas passage 3 or the vicinity of the surface) correlated to the temperature of the discharged gas. Examples of the temperature detector 6 include a thermocouple and a thermistor.

For example, in a case where the structural abnormality of the discharged gas passage 3 exists, there is a possibility that the discharged gas cannot be supplied to the CO detector 4 and the temperature detector 6.

The temperature detector 6 is heated by the potential heat of the discharged gas. By changing the heated amount of the discharged gas heated by the heater not shown, the difference between the detected temperatures of the temperature detector 6 in a case where the abnormality of the discharged gas passage 3 exists and the difference between the detected temperatures of the temperature detector 6 in a case where the abnormality of the discharged gas passage 3 does not exist become different from each other. In addition, by changing the output of at least one of the fuel supplier 19 and the air supplier 9, the flow rate of the discharged gas changes, so that the difference between the detected temperatures of the temperature detector 6 in a case where the abnormality of the discharged gas passage 3 exists and the difference between the detected temperatures of the temperature detector 6 in a case where the abnormality of the discharged gas passage 3 does not exist become different from each other.

The control circuitry 7 executes, when the discharged gas is flowing through the discharged gas passage 3, at least one of the operation of detecting the abnormality of the discharged gas passage 3 based on the difference between the detected temperatures of the temperature detector 6 relative to the difference between the heated amounts of the discharged gas heated by the heater not shown and the operation of detecting the abnormality of the discharged gas passage 3 based on the difference between the detected temperatures of the temperature detector 6 relative to the difference between the outputs of at least one of the fuel supplier 19 and the air supplier 9.

Examples of the above method of detecting the abnormality of the discharged gas passage 3 based on the difference between the detected temperatures of the temperature detector 6 relative to the difference between the outputs include a method of heating the discharged gas by the heater and a method of combusting the fuel by the combustor 1. In the former case, the combustor 1 may stop combusting the fuel or may combust the fuel. Therefore, in this case, examples of the discharged gas flowing through the discharged gas passage 3 include the flue gas, the air from the air supplier 9, the fuel from the fuel supplier 19, and the mixture of the air and fuel.

Thus, the abnormality of the discharged gas passage 3 can be detected based on the detected temperatures of the temperature detector 6. In the present embodiment, as shown in FIG. 1, the CO detector 4 is disposed on the discharged gas passage 3 and located at an upstream side of the flow of the discharged gas, and the temperature detector 6 is disposed on the discharged gas passage 3 and located at a downstream side of the flow of the discharged gas. With this, the abnormality of the entire discharged gas passage 3 extending between the combustor 1 and the CO detector 4 can be detected based on the detected temperatures of the temperature detector 6. However, in a case where the CO detector and the temperature detector are disposed on the discharged gas passage 3 and close to each other, the CO detector may be disposed on the discharged gas passage 3 and located at the downstream side of the flow of the discharged gas, and the temperature detector may be disposed on the discharged gas passage 3 and located at the upstream side of the flow of the discharged gas.

The heater may have any configuration as long as it can heat the discharged gas. One example of the heater is a ceramic heater. The control circuitry 7 may have any configuration as long as it has a control function. For example, the control circuitry 7 includes a calculation processing portion and a storage portion storing a control program. Examples of the calculation processing portion include an MPU and a CPU. One example of the storage portion is a memory. The control circuitry 7 may be constituted by a piece of control circuitry which performs centralized control or may be constituted by plural pieces of control circuitry which cooperate to perform distributed control.

Operations

Figure 2:
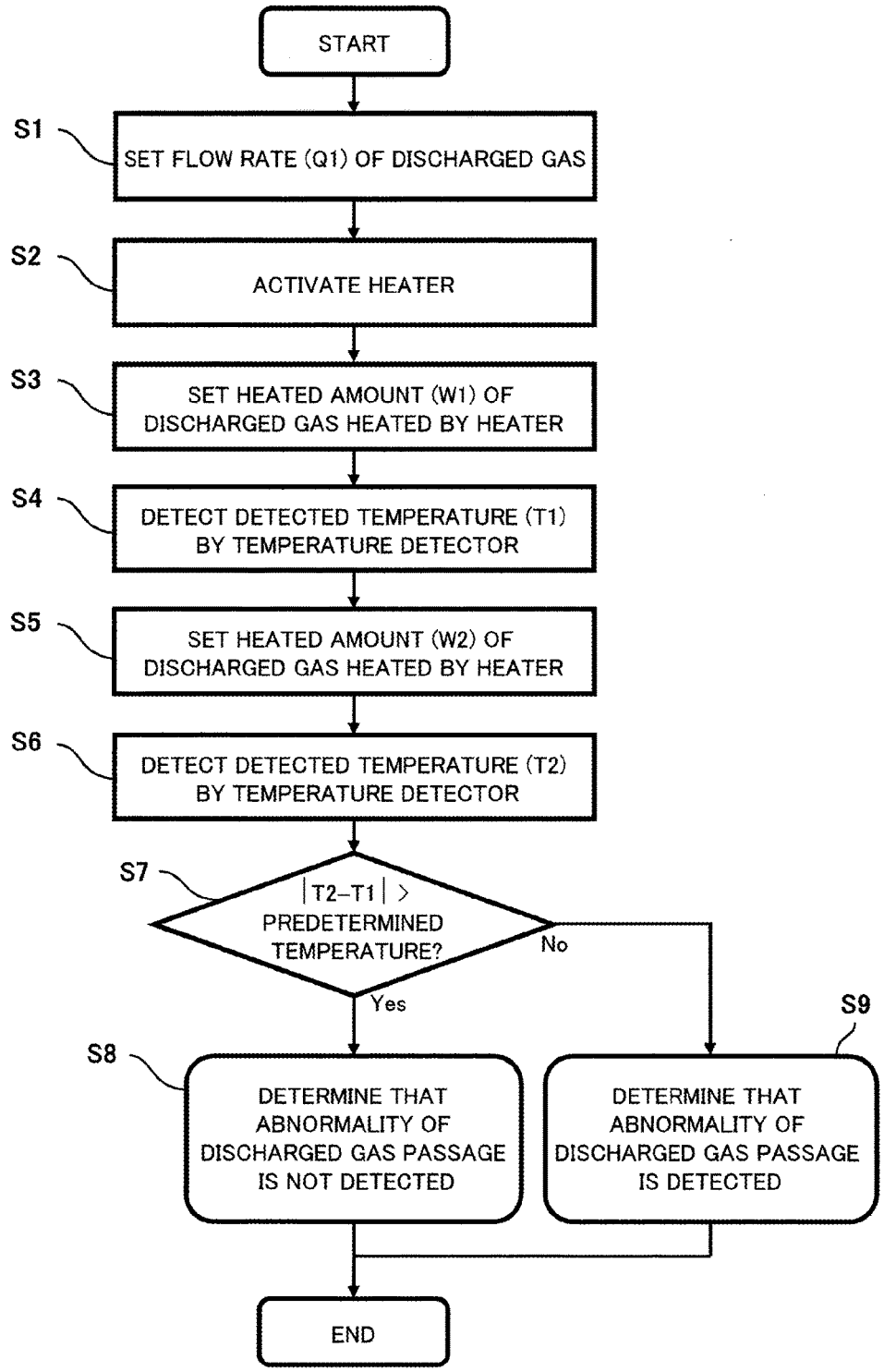
FIG. 2 is a flow chart showing one example of operations of the power generation system according to Embodiment 1.

FIG. 2 is a flow chart showing one example of operations of the power generation system according to Embodiment 1. The following operations are controlled by the control circuitry 7.

While the power generation system 100 is operating, the combustor 1 combusts the fuel, and the power generator 50 utilizes the energy obtained from the combustor 1 to generate the electric power.

On the other hand, as shown in FIG. 2, when the discharged gas is flowing through the discharged gas passage 3, the control circuitry 7 executes the operation of detecting the abnormality of the discharged gas passage 3 based on the difference between the detected temperatures of the temperature detector 6 relative to the difference between the heated amounts of the discharged gas heated by the heater not shown. In this case, the combustor 1 may stop combusting the fuel or may combust the fuel.

In Step S1, the flow rate of the discharged gas is adjusted to a predetermined flow rate (Q1). For example, in a case where the discharged gas is the air, the output of the air supplier 9 configured to supply the air to the combustor 1 may be changed.

Next, the heater is activated (Step S2), and the heated amount of the discharged gas heated by the heater is adjusted to a predetermined amount (W1) (Step S3).

At this time, a detected temperature (T1) of the temperature detector 6 is detected (Step S4).

Next, the output of the heater is changed, and the heated amount of the discharged gas heated by the heater is readjusted to a predetermined amount (W2) (Step S5).

At this time, a detected temperature (T2) of the temperature detector 6 is detected (Step S6).

Next, in Step S7, an absolute value of the difference (T2−T1) between the detected temperatures is calculated by using the detected temperature (T1) in Step S4 and the detected temperature (T2) in Step S6, and whether or not the absolute value exceeds a predetermined temperature is determined. The predetermined temperature in Step S7 is set as a value when the abnormality of the discharged gas passage 3 does not exist and is suitably set based on the design of the power generation system 100.

The following will discuss the absolute value of the difference (T2−T1) between the detected temperatures in a case where the abnormality of the discharged gas passage 3 exists and the absolute value of the difference (T2−T1) between the detected temperatures in a case where the abnormality of the discharged gas passage 3 does not exist.

First, in a case where the abnormality of the discharged gas passage 3 does not exist, the discharged gas flowing through the discharged gas passage 3 can be supplied to the temperature detector 6. In this case, the flow rate of the discharged gas is a constant flow rate (Q1), and if the heated amount (W1) of the discharged gas and the heated amount (W2) of the discharged gas are different from each other, the detected temperature of the temperature detector 6 in the case of the heated amount (W1) and the detected temperature of the temperature detector 6 in the case of the heated amount (W2) become different from each other. With this, the absolute value of the difference (T2−T1) between the detected temperatures is thought to exceed the predetermined temperature in Step S7.

In contrast, in a case where the abnormality of the discharged gas passage 3 exists, a possibility that the discharged gas flowing through the discharged gas passage 3 cannot be supplied to the temperature detector 6 is high. In this case, even if the heated amount (W1) of the discharged gas and the heated amount (W2) of the discharged gas are different from each other, the detected temperature of the temperature detector 6 in the case of the heated amount (W1) and the detected temperature of the temperature detector 6 in the case of the heated amount (W2) are not so different from each other. With this, the absolute value of the difference (T2−T1) between the detected temperatures is thought to be not more than the predetermined temperature in Step S7.

In a case where the absolute value of the difference (T2−T1) between the detected temperatures exceeds the predetermined temperature in Step S7, it is determined that the abnormality of the discharged gas passage 3 is not detected (Step S8).

In a case where the absolute value of the difference (T2−T1) between the detected temperatures is not more than the predetermined temperature in Step S7, it is determined that the abnormality of the discharged gas passage 3 is detected (Step S9).

It should be noted that the flow rate (Q1) of the discharged gas, the heated amounts (W1 and W2) of the discharged gas, a determination formula in Step S7, the predetermined temperature in Step S7, and the like are just examples and are not limited to these.

For example, one of the heated amount (W1) of the discharged gas and the heated amount (W2) of the discharged gas may be zero. In addition, the magnitude correlation between the heated amount (W1) of the discharged gas and the heated amount (W2) of the discharged gas does not matter. In a case where the heated amount (W1) is larger than the heated amount (W2), the detected temperature (T1) is higher than the detected temperature (T2). In a case where the heated amount (W1) is smaller than the heated amount (W2), the detected temperature (T1) is lower than the detected temperature (T2).

As above, in a case where the abnormality is determined based on a relative difference between the detected temperatures of the temperature detector 6 when the heated amount of the discharged gas heated by the heater is changed, influences such as an outside air temperature and a discharged gas temperature are made lower than a case where the abnormality is determined based on the magnitude of the absolute value of the detected temperature of the temperature detector 6. Thus, the detection of the abnormality becomes easier.

Figure 3:
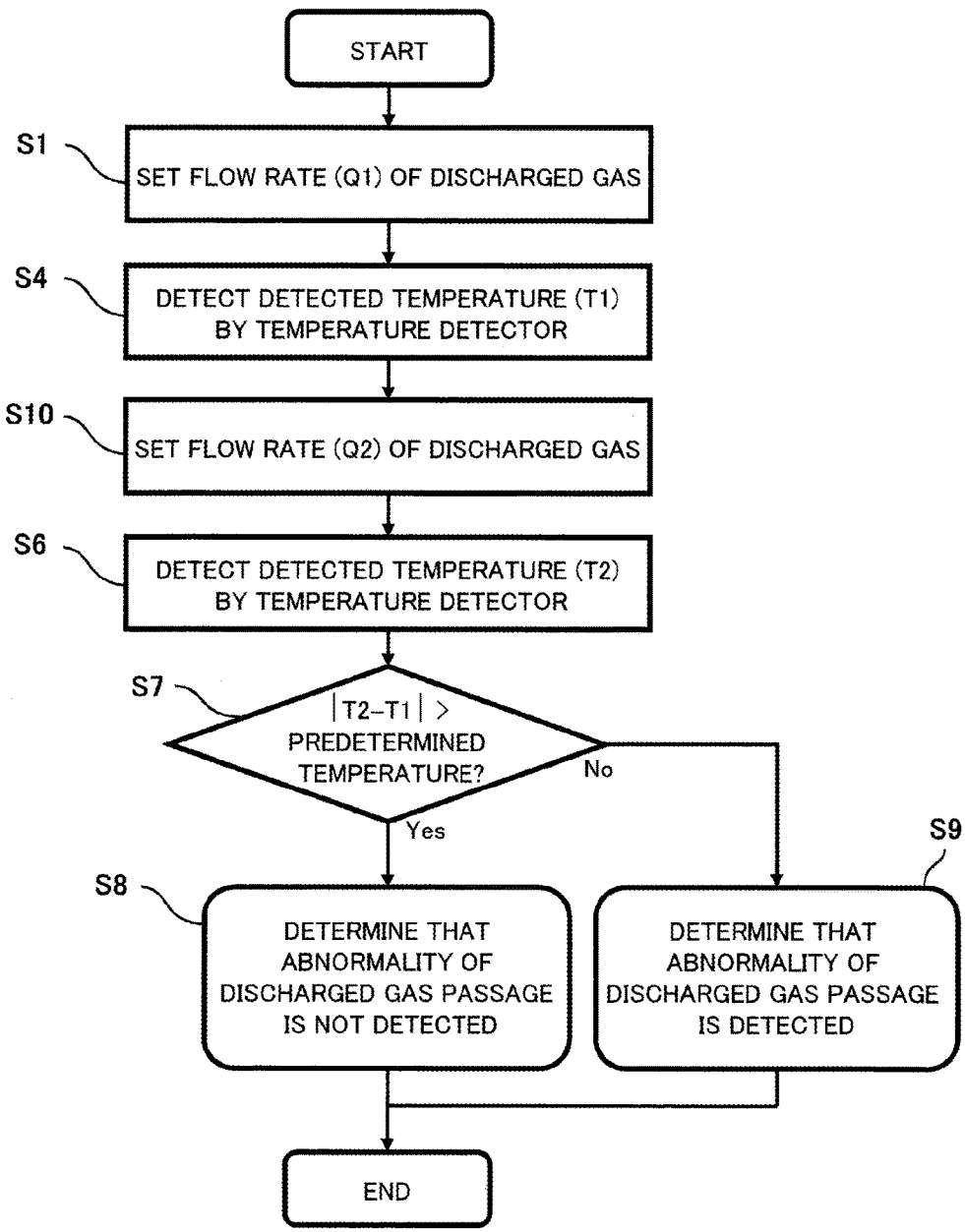
FIG. 3 is a flow chart showing one example of the operations of the power generation system according to Embodiment 1.

FIG. 3 is a flow chart showing one example of the operations of the power generation system according to Embodiment 1. The following operations are controlled by the control circuitry 7.

While the power generation system 100 is operating, the combustor 1 combusts the fuel, and the power generator 50 utilizes the energy obtained from the combustor 1 to generate the electric power.

On the other hand, as shown in FIG. 3, when the discharged gas is flowing through the discharged gas passage 3, the control circuitry 7 executes the operation of detecting the abnormality of the discharged gas passage 3 based on the difference between the detected temperatures of the temperature detector 6 relative to the difference between the outputs of at least one of the fuel supplier 19 and the air supplier 9. In this case, the heater not shown may heat the discharged gas, or the combustor 1 may combust the fuel. In a case where the heater heats the discharged gas, the combustor 1 may stop combusting the fuel or may combust the fuel. In addition, the heated amount of the discharged gas heated by the heater may be adjusted to the predetermined amount (W1).

In Step S1, the flow rate of the discharged gas is adjusted to the predetermined amount (Q1). For example, the flow rate of the discharged gas is adjusted by changing the output of at least one of the air supplier 9 configured to supply the air to the combustor 1 and the fuel supplier 19 configured to supply the fuel to the combustor 1.

At this time, the detected temperature (T1) of the temperature detector 6 is detected (Step S4).

Next, the flow rate of the discharged gas is readjusted to a predetermined flow rate (Q2) (Step S10). For example, the flow rate of the discharged gas is readjusted by changing the output of at least one of the air supplier 9 configured to supply the air to the combustor 1 and the fuel supplier 19 configured to supply the fuel to the combustor 1.

At this time, the detected temperature (T2) of the temperature detector 6 is detected (Step S6).

Next, in Step S7, the absolute value of the difference (T2−T1) between the detected temperatures is calculated by using the detected temperature (T1) in Step S4 and the detected temperature (T2) in Step S6, and whether or not the absolute value exceeds a predetermined temperature is determined. The predetermined temperature in Step S7 is suitably set based on the design of the power generation system 100 as a value when the structural abnormality of the discharged gas passage 3 does not exist.

The following will discuss the absolute value of the difference (T2−T1) between the detected temperatures in a case where the abnormality of the discharged gas passage 3 exists and the absolute value of the difference (T2−T1) between the detected temperatures in a case where the abnormality of the discharged gas passage 3 does not exist.

First, in a case where the abnormality of the discharged gas passage 3 does not exist, the discharged gas flowing through the discharged gas passage 3 can be supplied to the temperature detector 6. In this case, the heated amount of the discharged gas is zero or a constant amount (W1), and if the flow rate (Q1) of the discharged gas and the flow rate (Q2) of the discharged gas are different from each other, the detected temperature of the temperature detector 6 in the case of the flow rate (Q1) and the detected temperature of the temperature detector 6 in the case of the flow rate (Q2) become different from each other. With this, the absolute value of the difference (T2−T1) between the detected temperatures is thought to exceed the predetermined temperature in Step S7.

In contrast, in a case where the abnormality of the discharged gas passage 3 exists, a possibility that the discharged gas flowing through the discharged gas passage 3 cannot be supplied to the temperature detector 6 is high. In this case, even if the flow rate (Q1) of the discharged gas and the flow rate (Q2) of the discharged gas are different from each other, the detected temperature of the temperature detector 6 in the case of the flow rate (Q1) and the detected temperature of the temperature detector 6 in the case of the flow rate (Q2) are not so different from each other. With this, the absolute value of the difference (T2−T1) between the detected temperatures is thought to be not more than the predetermined temperature in Step S7.

In a case where the absolute value of the difference (T2−T1) between the detected temperatures exceeds the predetermined temperature in Step S7, it is determined that the abnormality of the discharged gas passage 3 is not detected (Step S8).

In a case where the absolute value of the difference (T2−T1) between the detected temperatures is not more than the predetermined temperature in Step S7, it is determined that the abnormality of the discharged gas passage 3 is detected (Step S9).

It should be noted that the flow rates (Q1 and Q2) of the discharged gas, the heated amount (W1) of the discharged gas, the determination formula in Step S7, the predetermined temperature in Step S7, and the like are just examples and are not limited to these.

For example, one of the flow rate (Q1) of the discharged gas and the flow rate (Q2) of the discharged gas may be zero. In addition, the magnitude correlation between the flow rate (Q1) of the discharged gas and the flow rate (Q2) of the discharged gas does not matter. In a case where the flow rate (Q1) is higher than the flow rate (Q2), the detected temperature (T2) is higher than the detected temperature (T1). In a case where the flow rate (Q1) is lower than the flow rate (Q2), the detected temperature (T2) is lower than the detected temperature (T1).

As above, in a case where the abnormality is determined based on a relative difference between the detected temperatures of the temperature detector 6 when the output of at least one of the fuel supplier 19 and the air supplier 9 is changed, the influences such as the outside air temperature and the discharged gas temperature are made lower than a case where the abnormality is determined based on the magnitude of the absolute value of the detected temperature of the temperature detector 6. Thus, the detection of the abnormality becomes easier.

Modification Example 1

The power generation system according to Modification Example 1 of Embodiment 1 is configured such that in the power generation system of Embodiment 1, the heater is disposed on the discharged gas passage and located at an upstream side of a flow of the discharged gas, and the temperature detector is disposed on the discharged gas passage and located at a downstream side of the flow of the discharged gas.

According to this configuration, the temperature detector can detect the temperature of the discharged gas heated by the heater. Therefore, since the difference between the detected temperature of the temperature detector in a case where the abnormality of the discharged gas passage exists and the detected temperature of the temperature detector in a case where the abnormality of the discharged gas passage does not exist becomes more significant, the abnormality of the discharged gas passage can be detected more easily based on the detected temperatures of the temperature detector.

Except for the above features, the power generation system according to the present modification example is the same as the power generation system according to Embodiment 1.

Device Configuration

Figure 4:
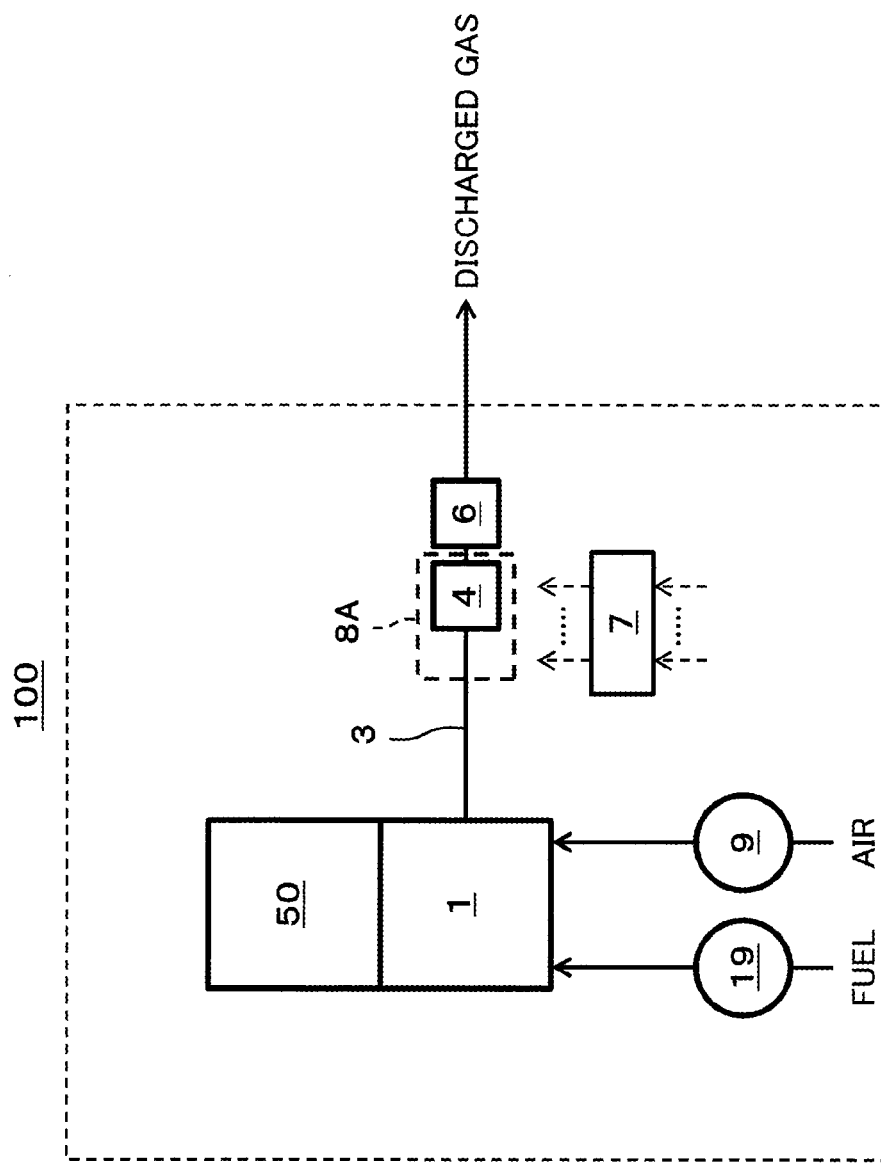
FIG. 4 is a diagram showing one example of the power generation system according to Modification Example 1 of Embodiment 1.

FIG. 4 is a diagram showing one example of the power generation system according to Modification Example 1 of Embodiment 1.

In the example shown in FIG. 4, the power generation system 100 according to the present modification example includes the combustor 1, the power generator 50, the discharged gas passage 3, the CO detector 4, the temperature detector 6, the control circuitry 7, the fuel supplier 19, the air supplier 9, and a heater 8A.

The power generation system 100 according to the present modification example is the same as the power generation system 100 according to Embodiment 1 except that the heater 8A is disposed on the discharged gas passage 3 and located at the upstream side of the flow of the discharged gas, and the temperature detector 6 is disposed on the discharged gas passage 3 and located at the downstream side of the flow of the discharged gas. Therefore, a detailed explanation of the power generation system 100 according to the present modification example is omitted.

With this, the temperature detector 6 can detect the temperature of the discharged gas heated by the heater 8A. Therefore, since the difference between the detected temperature of the temperature detector 6 in a case where the abnormality of the discharged gas passage 3 exists and the detected temperature of the temperature detector 6 in a case where the abnormality of the discharged gas passage 3 does not exist becomes more significant, the abnormality of the discharged gas passage 3 can be detected more easily based on the detected temperatures of the temperature detector 6.

A method of determining based on the detected temperatures of the temperature detector 6 whether or not the abnormality of the discharged gas passage 3 exists may be: a method of detecting the abnormality of the discharged gas passage 3 based on the absolute value of the detected temperature of the temperature detector 6; a method of detecting the abnormality of the discharged gas passage 3 by changing the heated amount of the heater 8A as shown in FIG. 2; and a method of detecting the abnormality of the discharged gas passage 3 by changing the flow rate of the discharged gas as shown in FIG. 3.

Modification Example 2

The power generation system according to Modification Example 2 of Embodiment 1 is configured such that in the power generation system according to Embodiment 1, the heater is disposed on the discharged gas passage and located at a downstream side of a flow of the discharged gas, and the temperature detector is disposed on the discharged gas passage and located at an upstream side of the flow of the discharged gas.

According to this configuration, by activating the heater, the difference between the detected temperature of the temperature detector in a case where the abnormality of the discharged gas passage exists and the detected temperature of the temperature detector in a case where the abnormality of the discharged gas passage does not exist becomes more significant. Therefore, the abnormality of the discharged gas passage can be easily detected based on the detected temperatures of the temperature detector.

Except for the above features, the power generation system according to the present modification example may be the same as the power generation system according to Embodiment 1.

Device Configuration

Figure 5:
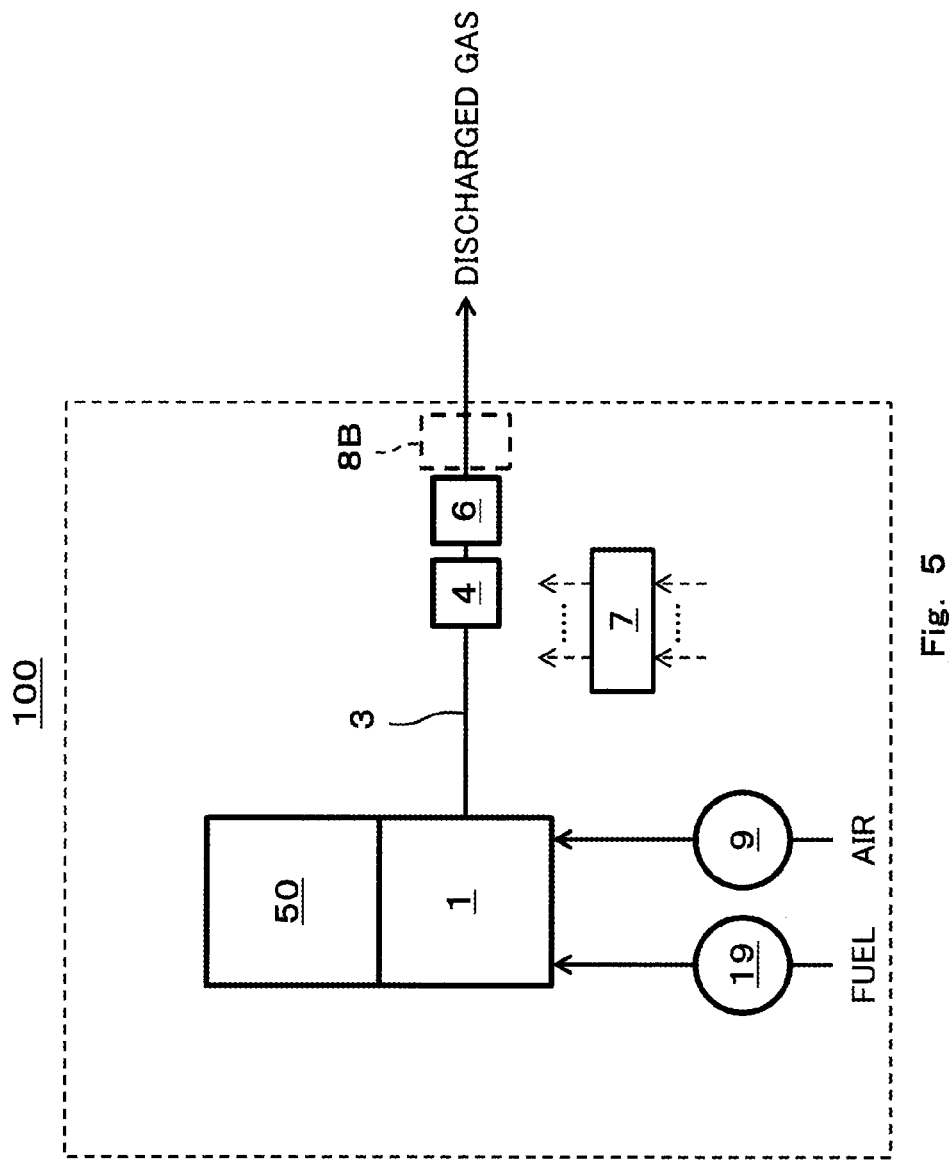
FIG. 5 is a diagram showing one example of the power generation system according to Modification Example 2 of Embodiment 1.

FIG. 5 is a diagram showing one example of the power generation system according to Modification Example 2 of Embodiment 1.

In the example shown in FIG. 5, the power generation system 100 according to the present modification example includes the combustor 1, the power generator 50, the discharged gas passage 3, the CO detector 4, the temperature detector 6, the control circuitry 7, the fuel supplier 19, the air supplier 9, and a heater 8B.

The power generation system 100 according to the present modification example is the same as the power generation system 100 according to Embodiment 1 except that the heater 8B is disposed on the discharged gas passage 3 and located at the downstream side of the flow of the discharged gas, and the temperature detector 6 is disposed on the discharged gas passage 3 and located at the upstream side of the flow of the discharged gas. Therefore, a detailed explanation of the power generation system 100 according to the present modification example is omitted.

With this, the periphery of the temperature detector 6 is heated by radiation heat of the heater 8B, so that the detected temperature of the temperature detector 6 increases. At this time, in a case where the abnormality of the discharged gas passage 3 does not exist, the heated amount of the temperature detector 6 heated by the radiation heat of the heater 8B is reduced by the discharged gas flowing on the temperature detector 6. In contrast, in a case where the abnormality of the discharged gas passage 3 exists, the amount of discharged gas flowing on the temperature detector 6 decreases. Therefore, the reduction in the heated amount of the temperature detector 6 heated by the radiation heat of the heater 8B is smaller than that in a case where the abnormality of the discharged gas passage 3 does not exist. As above, since the flow of the discharged gas influences the detected temperature of the temperature detector 6, the difference between the detected temperature of the temperature detector 6 in a case where the abnormality of the discharged gas passage 3 exists and the detected temperature of the temperature detector 6 in a case where the abnormality of the discharged gas passage 3 does not exist becomes more significant. Therefore, the abnormality of the discharged gas passage 3 can be detected more easily based on the detected temperatures of the temperature detector 6.

A method of determining based on the detected temperatures of the temperature detector 6 whether or not the abnormality of the discharged gas passage 3 exists may be: a method of detecting the abnormality of the discharged gas passage 3 based on the absolute value of the detected temperature of the temperature detector 6; a method of detecting the abnormality of the discharged gas passage 3 by changing the heated amount of the heater 8B as shown in FIG. 2; and a method of detecting the abnormality of the discharged gas passage 3 by changing the flow rate of the discharged gas as shown in FIG. 3.

Modification Example 3

The power generation system according to Modification Example 3 of Embodiment 1 is configured such that in the power generation system according to Modification Example 1 or 2 of Embodiment 1, the CO detector is disposed on the discharged gas passage and located between the heater and the temperature detector.

According to this configuration, the CO detector exists between the heater and the temperature detector, so that in a case where it is determined based on the detected temperatures of the temperature detector that the abnormality of the discharged gas passage does not exist, it can be presumed that the discharged gas flows on the CO detector.

In contrast, in a case where the CO detector is not arranged between the heater and the temperature detector, and it is determined based on the detected temperatures of the temperature detector that the abnormality of the discharged gas passage does not exist, it can be presumed that the discharged gas flows between the heater and the temperature detector. However, whether or not the discharged gas flows on the CO detector cannot be presumed clearly. Therefore, the power generation system according to the present modification example can more appropriately determine whether or not a state where the CO detection of the CO detector is hindered exists, than a case where the CO detector is not arranged between the heater and the temperature detector.

Except for the above features, the power generation system according to the present modification example may be the same as the power generation system according to Modification Example 1 or 2 of Embodiment 1.

Device Configuration

Figure 6:
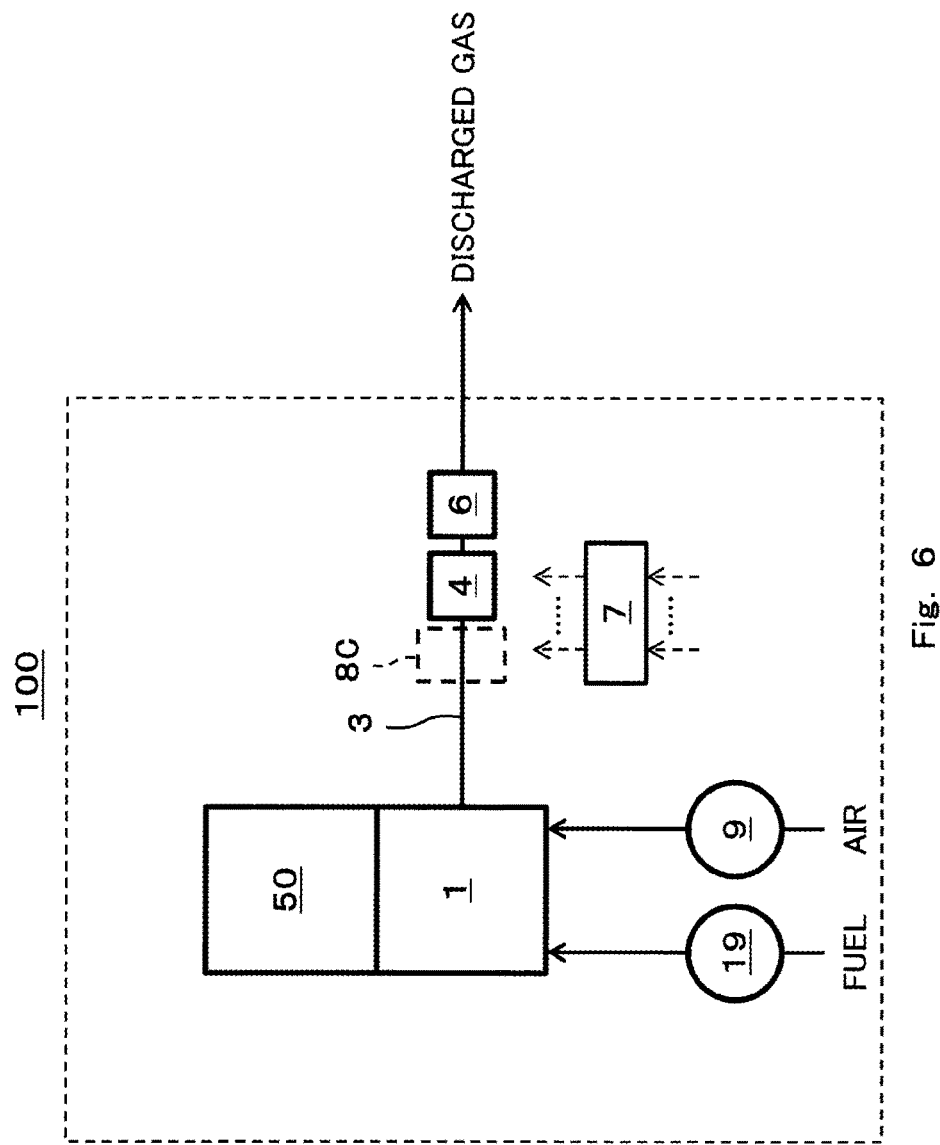
FIG. 6 is a diagram showing one example of the power generation system according to Modification Example 3 of Embodiment 1.

FIG. 6 is a diagram showing one example of the power generation system according to Modification Example 3 of Embodiment 1.

In the example shown in FIG. 6, the power generation system 100 according to the present modification example includes the combustor 1, the power generator 50, the discharged gas passage 3, the CO detector 4, the temperature detector 6, the control circuitry 7, the fuel supplier 19, the air supplier 9, and a heater 8C.

The power generation system 100 according to the present modification example is the same as the power generation system 100 according to Embodiment 1 except that the CO detector 4 is disposed on the discharged gas passage 3 and located between the heater 8C and the temperature detector 6. Therefore, a detailed explanation of the power generation system 100 according to the present modification example is omitted.

As shown in FIG. 6, the heater 8C, the CO detector 4, and the temperature detector 6 are disposed on the discharged gas passage 3 in this order along the flow of the discharged gas. However, the present modification example is not limited to this. The temperature detector, the CO detector, and the heater may be disposed on the discharged gas passage 3 in this order along the flow of the discharged gas.

With this, the CO detector 4 exists between the heater 8C and the temperature detector 6, so that in a case where it is determined based on the detected temperatures of the temperature detector 6 that the abnormality of the discharged gas passage 3 does not exist, it can be presumed that the discharged gas flows on the CO detector 4.

A method of determining based on the detected temperatures of the temperature detector 6 whether or not the abnormality of the discharged gas passage 3 exists may be: a method of detecting the abnormality of the discharged gas passage 3 based on the absolute value of the detected temperature of the temperature detector 6; a method of detecting the abnormality of the discharged gas passage 3 by changing the heated amount of the heater 8C as shown in FIG. 2; and a method of detecting the abnormality of the discharged gas passage 3 by changing the flow rate of the discharged gas as shown in FIG. 3.

Embodiment 2

The power generation system according to Embodiment 2 is configured such that: in the power generation system according to any one of Embodiment 1 and Modification Examples 1 to 3 of Embodiment 1, when the air supplier is supplying the air in a state where the combustor is not performing combustion, the control circuitry executes at least one of: an operation of detecting the abnormality of the discharged gas passage based on the difference between the detected temperatures of the temperature detector relative to a difference between the heated amounts of the air discharged from the combustor and heated by the heater; and an operation of, while the heater is heating the air discharged from the combustor, detecting the abnormality of the discharged gas passage based on the difference between the detected temperatures of the temperature detector relative to a difference between the outputs of the air supplier.

According to this configuration, whether or not the abnormality of the discharged gas passage exists can be detected by supplying the air to the discharged gas passage before the combustor starts the combustion. Therefore, a possibility that the CO leaks from the discharged gas passage by the abnormality of the discharged gas passage can be made lower than a case where the abnormality of the discharged gas passage is detected at the time of the combustion of the combustor.

Except for the above features, the power generation system according to the present embodiment may be the same as the power generation system according to any one of Embodiment 1 and Modification Examples 1 to 3 of Embodiment 1.

Device Configuration

The power generation system 100 according to the present embodiment is the same as the power generation system 100 according to Embodiment 1 except for the method of detecting the abnormality of the discharged gas passage 3 by the control circuitry 7. Therefore, a detailed explanation of the power generation system 100 according to the present embodiment is omitted.

In the present embodiment, when the air supplier 9 is supplying the air in a state where the combustor 1 is not performing combustion, the control circuitry 7 executes at least one of: the operation of detecting the abnormality of the discharged gas passage 3 based on the difference between the detected temperatures of the temperature detector 6 relative to the difference between the heated amounts of the air discharged from the combustor 1 and heated by the heater; and the operation of, while the heater is heating the air discharged from the combustor 1, detecting the abnormality of the discharged gas passage 3 based on the difference between the detected temperatures of the temperature detector 6 relative to the difference between the outputs of the air supplier 9.

With this, whether or not the abnormality of the discharged gas passage 3 exists can be detected by supplying the air to the discharged gas passage 3 before the combustor 1 starts the combustion. Therefore, the possibility that the CO leaks from the discharged gas passage 3 by the abnormality of the discharged gas passage 3 can be made lower than a case where the abnormality of the discharged gas passage 3 is detected at the time of the combustion of the combustor 1.

Embodiment 3

The power generation system according to Embodiment 2 is configured such that in the power generation system according to any one of Embodiment 1 and Modification Examples 1 to 3 of Embodiment 1, while the heater is heating the discharged gas when the discharged gas is flowing through the discharged gas passage, the control circuitry detects the abnormality of the discharged gas passage based on the difference between the detected temperatures of the temperature detector relative to the difference between the outputs of at least one of the fuel supplier and the air supplier.

According to this configuration, regardless of the stop or execution of the combustion by the combustor, the abnormality of the discharged gas passage can be detected by causing the discharged gas to flow through the discharged gas passage while heating the discharged gas by the heater.

For example, by detecting the abnormality of the discharged gas passage before the combustor starts the combustion, the possibility that the CO leaks from the discharged gas passage by the abnormality of the discharged gas passage can be made lower than a case where the abnormality of the discharged gas passage is detected at the time of the combustion by the combustor.

Except for the above features, the power generation system according to the present embodiment may be the same as the power generation system according to any one of Embodiment 1 and Modification Examples 1 to 3 of Embodiment 1.

Device Configuration

The power generation system 100 according to the present embodiment is the same as the power generation system 100 according to Embodiment 1 except for the method of detecting the abnormality of the discharged gas passage 3 by the control circuitry 7. Therefore, a detailed explanation of the power generation system 100 according to the present embodiment is omitted.

In the present embodiment, while the heater is heating the discharged gas when the discharged gas is flowing through the discharged gas passage 3, the control circuitry 7 detects the abnormality of the discharged gas passage 3 based on the difference between the detected temperatures of the temperature detector 6 relative to the difference between the outputs of at least one of the fuel supplier 19 and the air supplier 9.

With this, regardless of the stop or execution of the combustion by the combustor 1, the abnormality of the discharged gas passage 3 can be detected by causing the discharged gas to flow through the discharged gas passage 3 while heating the discharged gas by the heater. For example, by detecting the abnormality of the discharged gas passage 3 before the combustor 1 starts the combustion, the possibility that the CO leaks from the discharged gas passage 3 by the abnormality of the discharged gas passage 3 can be made lower than a case where the abnormality of the discharged gas passage 3 is detected at the time of the combustion by the combustor 1.

Embodiment 4

The power generation system according to Embodiment 4 is configured such that in the power generation system according to any one of Embodiment 1, Modification Examples 1 to 3 of Embodiment 1, Embodiment 2, and Embodiment 3, the power generator includes: a reformer operative to generate a hydrogen-containing gas by using a raw material; and a fuel cell operative to generate the electric power by using the hydrogen-containing gas.

According to this configuration, in a case where the power generator is the fuel cell unit, the structural abnormalities of the discharged gas passage in the case of detecting the CO in the discharged gas can be detected more appropriately than conventional cases. With this, the state where the CO detection is hindered can be appropriately known.

Except for the above features, the power generation system according to the present embodiment may be the same as the power generation system according to any one of Embodiment 1, Modification Examples 1 to 3 of Embodiment 1, Embodiment 2, and Embodiment 3.

Device Configuration

Figure 7:
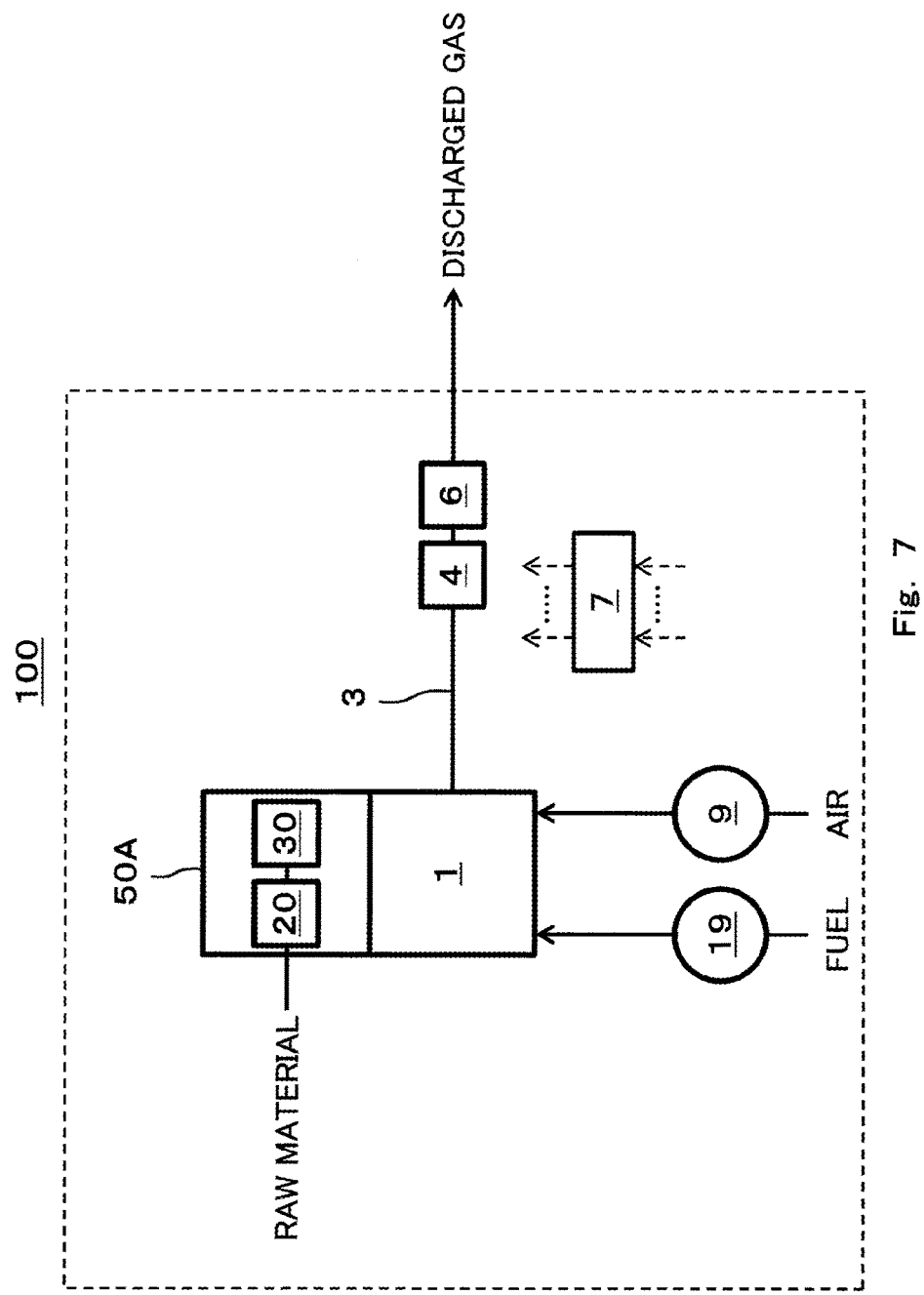
FIG. 7 is a diagram showing one example of the power generation system according to Embodiment 4.

FIG. 7 is a diagram showing one example of the power generation system according to Embodiment 4.

In the example shown in FIG. 7, the power generation system 100 according to the present embodiment includes the combustor 1, a power generator 50A, the discharged gas passage 3, the CO detector 4, the temperature detector 6, the control circuitry 7, the fuel supplier 19, and the air supplier 9.

Since the combustor 1, the discharged gas passage 3, the CO detector 4, the temperature detector 6, the control circuitry 7, the fuel supplier 19, and the air supplier 9 are the same as those in Embodiment 1, explanations thereof are omitted.

The power generator 50A includes a reformer 20 and a fuel cell 30.

The reformer 20 generates the hydrogen-containing gas by using the raw material. Specifically, the reformer 20 causes a reforming reaction of the raw material to generate the hydrogen-containing gas. The reforming reaction may be any reaction, and examples thereof include a steam-reforming reaction, an autothermal reaction, and a partial oxidation reaction. Although not shown in FIG. 7, devices required for respective reforming reactions are suitably provided. For example, in a case where the reforming reaction is the steam-reforming reaction or the autothermal reaction, the power generation system 100 includes, in addition to the combustor 1, an evaporator configured to generate steam and a water supplier configured to supply water to the evaporator. In a case where the reforming reaction is the autothermal reaction, the power generation system 100 further includes an air supplier configured to supply air to the reformer. The raw material contains an organic compound constituted by at least carbon and hydrogen, and examples thereof include a city gas containing methane as a major component, a natural gas, and a LPG The raw material is supplied from a raw material supply source. The raw material supply source has predetermined supply pressure, and examples thereof include a raw material bomb and a raw material infrastructure.

The fuel cell 30 generates electric power by using the hydrogen-containing gas. The fuel cell 30 may be any type of fuel cell, and examples thereof include a polymer electrolyte fuel cell (PEFC), a solid oxide fuel cell (SOFC), and a phosphoric acid fuel cell.

Thus, in a case where the power generator 50A is the fuel cell unit, the structural abnormalities of the discharged gas passage 3 in the case of detecting the CO in the discharged gas can be detected more appropriately than conventional cases. With this, the state where the CO detection is hindered can be appropriately known.

Embodiment 5

The power generation system according to Embodiment 5 is configured such that in the power generation system according to any one of Embodiment 1, Modification Examples 1 to 3 of Embodiment 1, Embodiment 2, and Embodiment 3, the power generator includes an electric generator operative to generate electric power by using power obtained from an engine serving as the combustor.

According to this configuration, in a case where the power generator is the gas engine power generator, the structural abnormalities of the discharged gas passage in the case of detecting the CO in the discharged gas can be detected more appropriately than conventional cases. With this, the state where the CO detection is hindered can be appropriately known.

Except for the above features, the power generation system according to the present embodiment may be the same as the power generation system according to any one of Embodiment 1, Modification Examples 1 to 3 of Embodiment 1, Embodiment 2, and Embodiment 3.

Device Configuration

Figure 8:
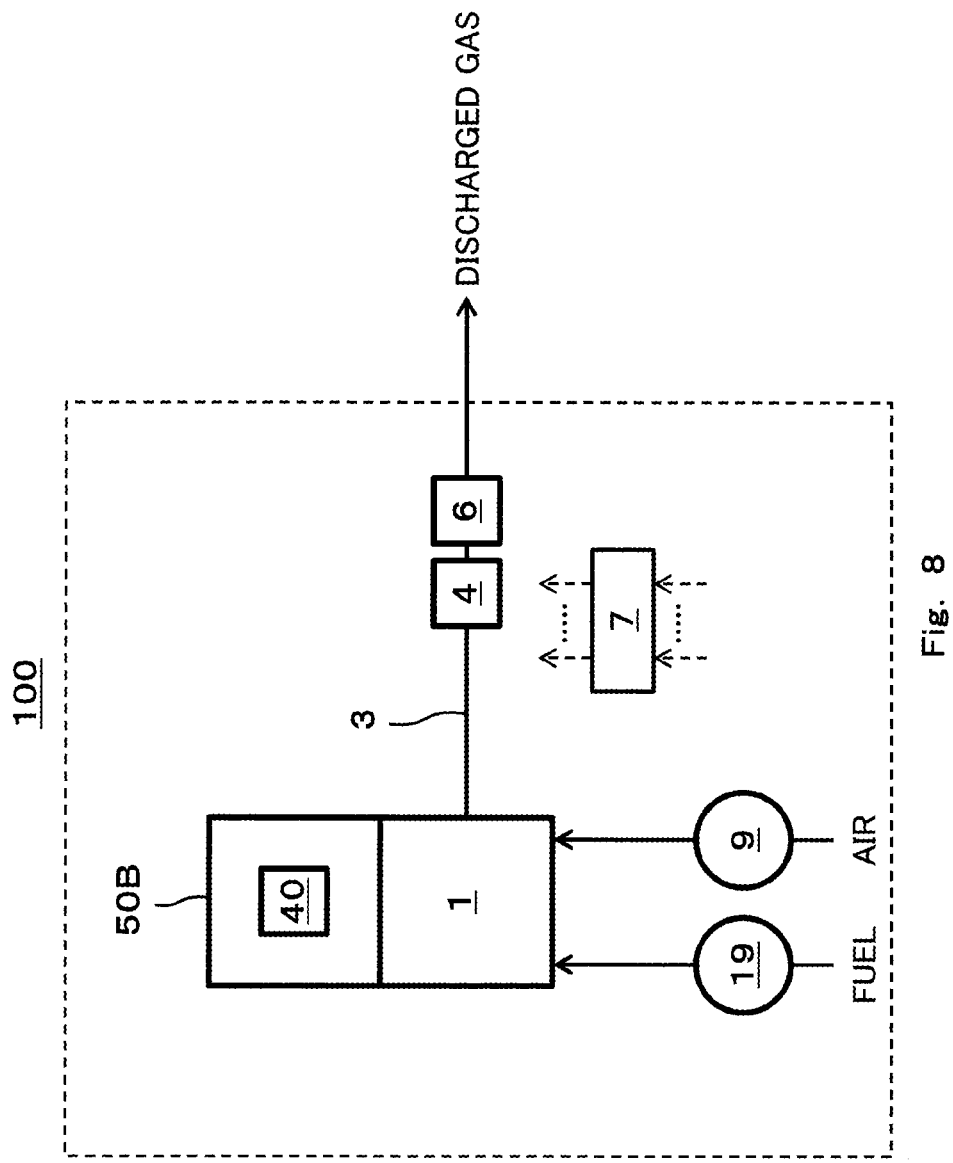
FIG. 8 is a diagram showing one example of the power generation system according to Embodiment 5.

FIG. 8 is a diagram showing one example of the power generation system according to Embodiment 5.

In the example shown in FIG. 8, the power generation system 100 according to the present embodiment includes the combustor 1, a power generator 50B, the discharged gas passage 3, the CO detector 4, the temperature detector 6, the control circuitry 7, the fuel supplier 19, and the air supplier 9.

Since the combustor 1, the discharged gas passage 3, the CO detector 4, the temperature detector 6, the control circuitry 7, the fuel supplier 19, and the air supplier 9 are the same as those in Embodiment 1, explanations thereof are omitted.

The power generator 50B includes an electric generator 40.

The electric generator 40 generates electric power by using power obtained from an engine serving as the combustor 1. The electric generator 40 may have any configuration as long as it can generate the electric power by using the power obtained from the engine. One example of the electric generator 40 is a gas engine electric generator.

With this, in a case where the power generator 50B is the gas engine power generator, the structural abnormalities of the discharged gas passage 3 in the case of detecting the CO in the discharged gas can be detected more appropriately than conventional cases. With this, the state where the CO detection is hindered can be appropriately known.

Embodiment 6

The present inventors have diligently studied a problem regarding the CO detector when the hydrogen-containing gas is combusted in the combustor to be discharged. As a result, the present inventors have obtained the following findings.

For example, in a case where the contact combustion type CO detector or the semiconductor type CO detector is used in the fuel cell system, there is a possibility that if the combustor cannot appropriately combust the hydrogen-containing gas, the CO detector is exposed to the hydrogen contained in the discharged gas flowing from the combustor through the discharged gas passage. This causes a problem in which an electrode and a catalyst performing a main function of the CO sensor deteriorate with time. This deterioration is caused, for example, since the catalyst is reduced by the hydrogen contained in the discharged gas, and this hinders a detection reaction of the CO detector.

The power generation system according to the present embodiment is configured such that the power generation system according to Embodiment 4 further includes: a branch passage branching from the discharged gas passage; and a blocker which is disposed on the branch passage and operative to block a flow of the discharged gas, wherein: the CO detector is disposed on the branch passage; the combustor combusts the hydrogen-containing gas as the fuel; the temperature detector detects the temperature of the discharged gas flowing through the branch passage; and when the discharged gas is flowing through the discharged gas passage, the control circuitry cancels blocking of the blocker and detects sticking of the blocker based on the detected temperatures detected by the temperature detector after the blocking of the blocker is canceled.

In a case where the blocker cannot be opened due to the sticking of the blocker even after the blocking of the blocker is canceled, a clogging abnormality of the branch passage of the discharged gas passage occurs. In this case, there is a possibility that the discharged gas cannot reach the CO detector, and therefore, the CO detector cannot detect the CO generated by, for example, the incomplete combustion of the combustor.

According to the above configuration, since the sticking of the blocker is detected, the state where the CO detection is hindered can be appropriately known.

When the discharged gas is flowing through the discharged gas passage, the detected temperature of the temperature detector in a case where the blocker is stuck and the detected temperature of the temperature detector in a case where the blocker is not stuck become different from each other by the potential heat of the discharged gas. Therefore, the sticking of the blocker can be detected based on the detected temperatures of the temperature detector.

Except for the above features, the power generation system according to the present embodiment may be the same as the power generation system of Embodiment 4.

Device Configuration

Figure 9:
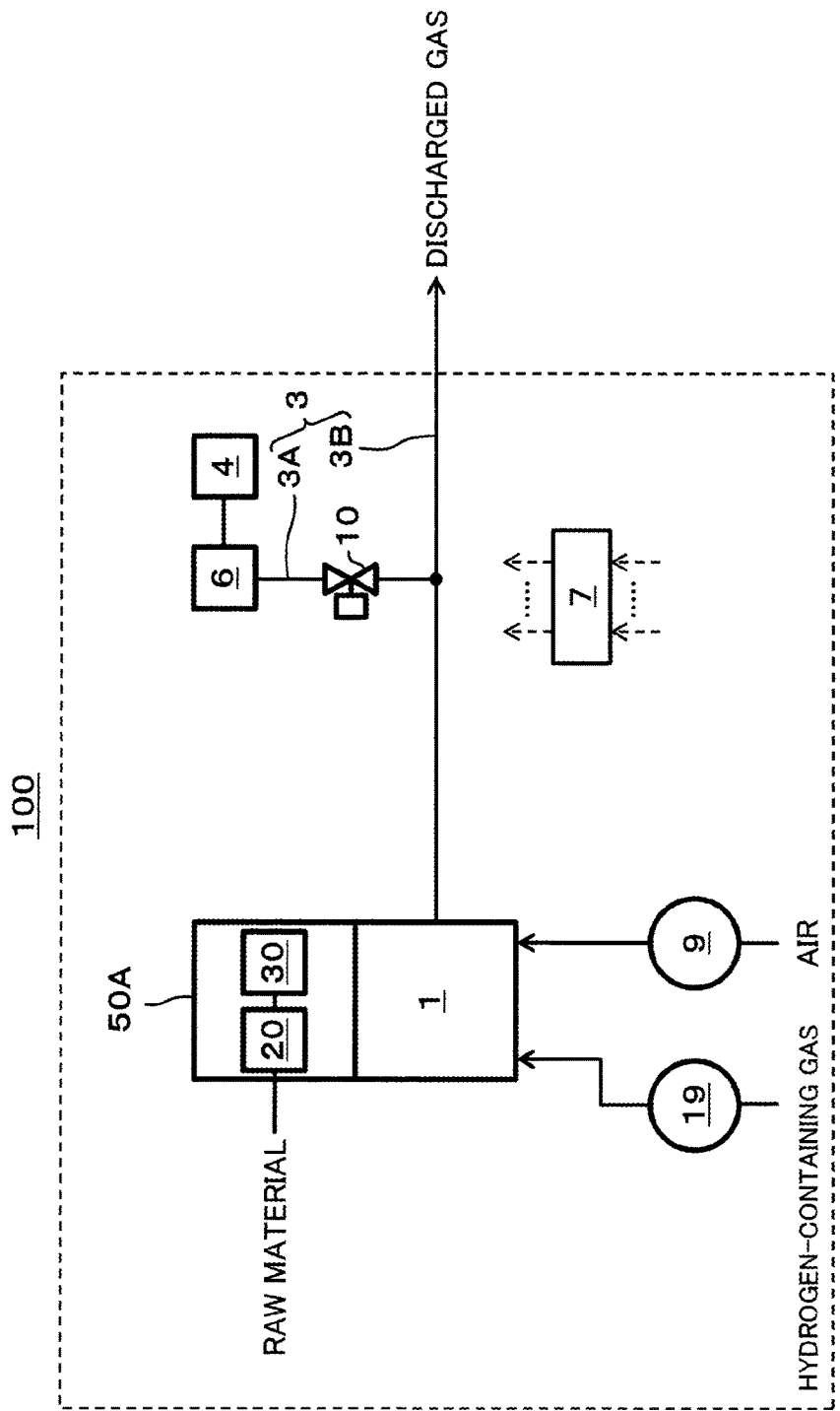
FIG. 9 is a diagram showing one example of the power generation system according to Embodiment 6.

FIG. 9 is a diagram showing one example of the power generation system according to Embodiment 6.

In the example shown in FIG. 9, the power generation system 100 according to the present embodiment includes the combustor 1, the power generator 50A, a branch passage 3A, a main passage 3B, the CO detector 4, the temperature detector 6, the control circuitry 7, a blocker 10, the fuel supplier 19, and the air supplier 9.

The combustor 1 combusts the hydrogen-containing gas as the fuel. The hydrogen-containing gas from the fuel supplier 19 and the air from the air supplier 9 are supplied to the combustor 1. The reformer 20 of the power generator 50A is heated by the combustion of the hydrogen-containing gas and the air in the combustor 1. The fuel of the combustor 1 may be any fuel. For example, the hydrogen-containing gas discharged from the reformer 20 or a fuel off gas discharged from the fuel cell 30 of the power generator 50A may be used as the combustion fuel. As described above, the combustor 1 may be the premix combustion burner or the diffusion combustion burner.

The branch passage 3A branches from the discharged gas passage 3. To be specific, the branch passage 3A of the discharged gas passage 3 branches from a portion of the main passage 3B of the discharged gas passage 3. In the present embodiment, the branch passage 3A constitutes a discharged gas opposed flow passage through which the discharged gas flows toward the CO detector 4 to reach the CO detector 4 and then flows through the branch passage 3A again to return to the main passage 3B. However, the present embodiment is not limited to this. For example, a discharged gas bypass passage may be configured such that the branch passage further extends from the CO detector 4, and a downstream end of the branch passage is connected to the main passage 3B.

The CO detector 4 is disposed on the branch passage 3A. The CO detector 4 may have any configuration as long as it can detect the CO in the discharged gas. As described above, the CO detector 4 may be the contact combustion type CO detector or the semiconductor type CO detector.

The blocker 10 is disposed on the branch passage 3A to block the flow of the discharged gas. With this, the inflow of the discharged gas into the branch passage 3A is blocked.

In a case where the flow of the discharged gas is blocked by the blocker 10, the possibility that the CO detector 4 is exposed to the hydrogen in the discharged gas is reduced.

In contrast, in a case where the blocking of the blocker 10 is canceled, the CO detection can be performed by the CO detector 4. With this, the CO in the discharged gas generated by, for example, the incomplete combustion of the combustor 1 can be appropriately detected by the CO detector 4.

The blocker 10 may have any configuration as long as it can block the flow of the discharged gas. For example, the blocker 10 may be an on-off valve.

The temperature detector 6 detects the temperature of the discharged gas flowing through the branch passage 3A. In the present embodiment, the temperature detector 6 is disposed on the branch passage 3A and located between the blocker 10 and the CO detector 4. As described above, examples of the temperature detector 6 include a thermocouple and a thermistor.

In a case where the blocker 10 cannot be opened due to the sticking of the blocker 10 even after the blocking of the blocker 10 is canceled, the clogging abnormality of the branch passage 3A of the discharged gas passage 3 occurs. In this case, there is a possibility that the discharged gas cannot reach the CO detector 4, and therefore, the CO detector 4 cannot detect the CO generated by, for example, the incomplete combustion of the combustor 1.

In the present embodiment, when the discharged gas is flowing through the discharged gas passage 3, the control circuitry 7 cancels the blocking of the blocker 10 and detects the sticking of the blocker 10 based on the detected temperatures detected by the temperature detector 6 after the blocking of the blocker 10 is canceled. To be specific, when the discharged gas is flowing through the discharged gas passage 3, the detected temperature of the temperature detector 6 in a case where the blocker 10 is stuck and the detected temperature of the temperature detector 6 in a case where the blocker 10 is not stuck become different from each other by the potential heat of the discharged gas. Therefore, the sticking of the blocker 10 can be detected based on the detected temperatures of the temperature detector 6.

Embodiment 7

The power generation system according to Embodiment 7 is configured such that in the power generation system according to Embodiment 6, when canceling at least the blocking of the blocker, the control circuitry activates the heater disposed on the branch passage and located upstream of the temperature detector.

According to this configuration, by activating the heater, the difference between the detected temperature of the temperature detector in a case where the blocker is stuck and the detected temperature of the temperature detector in a case where the blocker is not stuck becomes more significant. Therefore, the abnormality of the discharged gas passage can be detected more easily.

Except for the above features, the power generation system according to the present embodiment may be the same as the power generation system according to Embodiment 6.

Device Configuration

Figure 10:
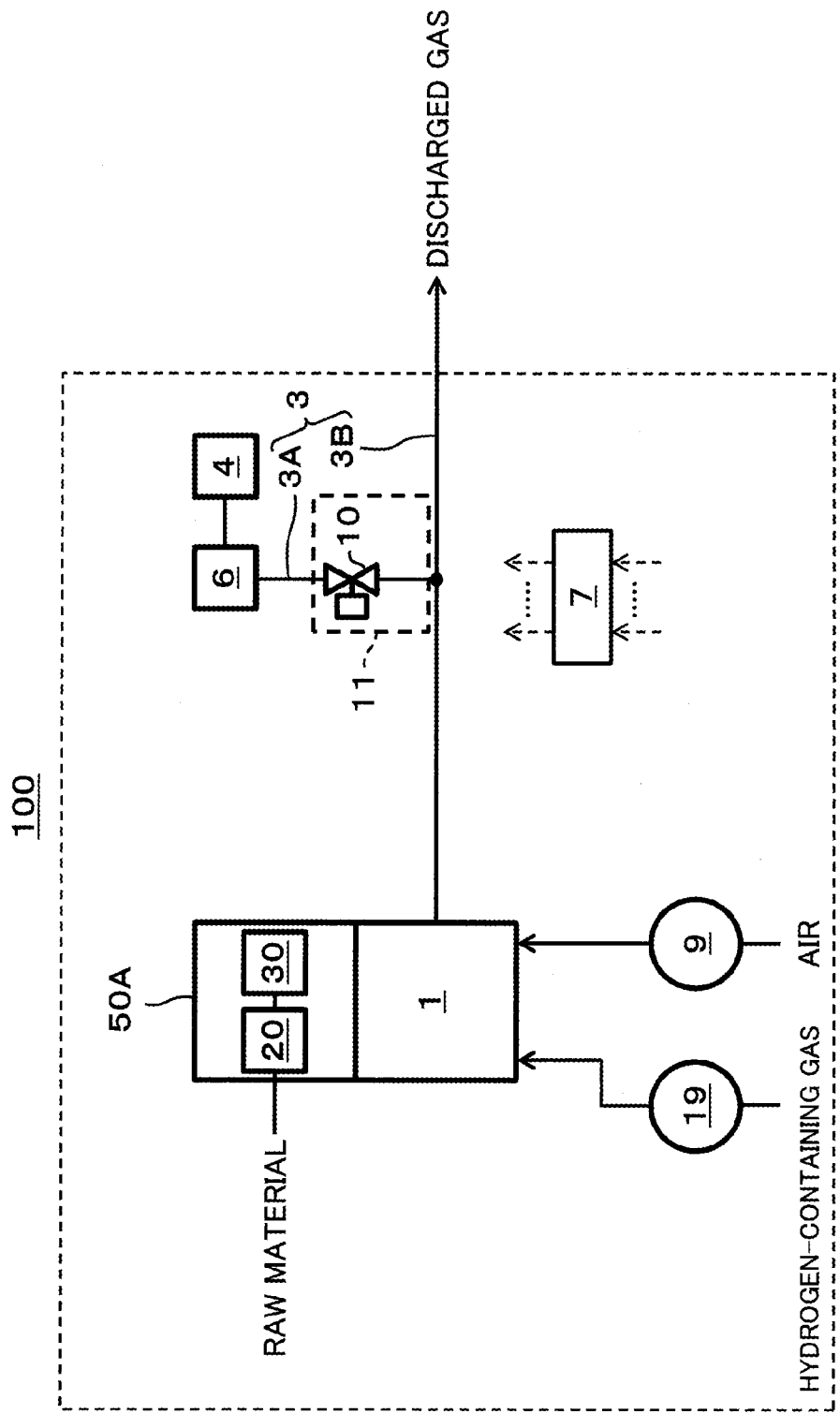
FIG. 10 is a diagram showing one example of the power generation system according to Embodiment 7.

FIG. 10 is a diagram showing one example of the power generation system according to Embodiment 7.

In the example shown in FIG. 10, the power generation system 100 according to the present embodiment includes the combustor 1, the power generator 50A, the branch passage 3A, the main passage 3B, the CO detector 4, the temperature detector 6, the control circuitry 7, the blocker 10, a heater 11, the fuel supplier 19, and the air supplier 9.

Since the combustor 1, the power generator 50A, the branch passage 3A, the main passage 3B, the CO detector 4, the temperature detector 6, and the blocker 10 are the same as those in Embodiment 6, explanations thereof are omitted.

When canceling at least the blocking of the blocker 10, the control circuitry 7 activates the heater 11 disposed on the branch passage 3A and located upstream of the temperature detector 6. With this, the discharged gas flowing through the branch passage 3A is heated. At this time, the heated amount of the discharged gas may be adjusted by changing the output of the heater 11. The heater 11 may have any configuration as long as it can heat the discharged gas. One example of the heater 11 is a ceramic heater.

When canceling at least the blocking of the blocker 10, the control circuitry 7 activates the heater 11. With this, by activating the heater 11, the difference between the detected temperature of the temperature detector 6 in a case where the blocker 10 is stuck and the detected temperature of the temperature detector 6 in a case where the blocker 10 is not stuck becomes more significant. Therefore, the abnormality of the discharged gas passage 3 can be detected more easily.

Embodiment 8

The power generation system according to Embodiment 8 is configured such that in the power generation system according to any one of Embodiment 1, Modification Examples 1 to 3 of Embodiment 1, and Embodiments 2 to 7, when the abnormality of the discharged gas passage is detected, the control circuitry causes an informer to inform of the abnormality of the discharged gas passage.

According to this configuration, the abnormality of the discharged gas passage can be known timely.

Except for the above features, the power generation system according to the present embodiment may be the same as the power generation system according to any one of Embodiment 1, Modification Examples 1 to 3 of Embodiment 1, and Embodiments 2 to 7.

Device Configuration

The power generation system 100 according to the present embodiment is the same as the power generation system 100 according to any one of Embodiment 1, Modification Examples 1 to 3 of Embodiment 1, and Embodiments 2 to 7 except that when the abnormality of the discharged gas passage 3 is detected, the control circuitry 7 causes the informer not shown to inform of the abnormality of the discharged gas passage 3. Therefore, a detailed explanation of the power generation system 100 according to the present embodiment is omitted.

For example, after Step S9 in FIG. 2 or 3, the control circuitry 7 may cause the informer to inform of the detection of the abnormality of the discharged gas passage 3.

The informer may have any configuration as long as it can inform of the detection of the abnormality of the discharged gas passage 3. Examples of the informer include a remote controller of a user and a monitoring center of a maintenance company.

With this, the abnormality of the discharged gas passage 3 can be known timely.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

One aspect of the present invention can appropriately deal with the structural abnormalities of the discharged gas passage in the case of detecting the CO in the discharged gas. Therefore, the aspect of the present invention can be utilized, for example, in the power generation system and the method of operating the power generation system.

REFERENCE SIGNS LIST 1 combustor
3 discharged gas passage
4 CO detector
6 temperature detector
7 control circuitry
9 air supplier
8A, 8B, 8C, 11 heater
10 blocker
19 fuel supplier
20 reformer
30 fuel cell
40 electric generator
50 power generator
100 power generation system

The invention claimed is:

1. A power generation system comprising:
   a combustor operative to combusts a fuel;
   a power generator operative to utilize energy obtained from the combustor when generating electric power;
   a fuel supplier operative to supply the fuel to the combustor;
   an air supplier operative to supply combustion air to the combustor;
   a discharged gas passage through which a discharged gas from the combustor flows;
   a CO detector operative to detect CO in the discharged gas;
   a temperature detector operative to detect a temperature of the discharged gas; and
   control circuitry operative to, when the discharged gas is flowing through the discharged gas passage, perform at least one of:
      an operation of detecting a structural abnormality of the discharged gas passage based on a difference between detected temperatures of the temperature detector relative to a difference between heated amounts of the discharged gas heated by a heater, and
      an operation of detecting the structural abnormality of the discharged gas passage based on the difference between the detected temperatures of the temperature detector relative to a difference between outputs of at least one of the fuel supplier and the air supplier.

2. The power generation system according to claim 1, wherein the heater is disposed on the discharged gas passage and located at an upstream side of a flow of the discharged gas, and the temperature detector is disposed on the discharged gas passage and located at a downstream side of the flow of the discharged gas.

3. The power generation system according to claim 1, wherein the heater is disposed on the discharged gas passage and located at a downstream side of a flow of the discharged gas, and the temperature detector is disposed on the discharged gas passage and located at an upstream side of the flow of the discharged gas.

4. The power generation system according to claim 2, wherein the CO detector is disposed on the discharged gas passage and located between the heater and the temperature detector.

5. The power generation system according to claim 1, wherein when the air supplier is supplying the air in a state where the combustor is not performing combustion, the control circuitry executes at least one of:
   an operation of detecting the structural abnormality of the discharged gas passage based on the difference between the detected temperatures of the temperature detector relative to a difference between the heated amounts of the air discharged from the combustor and heated by the heater; and
   an operation of, while the heater is heating the air discharged from the combustor, detecting the structural abnormality of the discharged gas passage based on the difference between the detected temperatures of the temperature detector relative to a difference between the outputs of the air supplier.

6. The power generation system according to claim 1, wherein while the heater is heating the discharged gas when the discharged gas is flowing through the discharged gas passage, the control circuitry detects the structural abnormality of the discharged gas passage based on the difference between the detected temperatures of the temperature detector relative to the difference between the outputs of at least one of the fuel supplier and the air supplier.

7. The power generation system according to claim 1, wherein the power generator includes: a reformer operative to generate a hydrogen-containing gas by using a raw material; and a fuel cell operative to generate the electric power by using the hydrogen-containing gas.

8. The power generation system according to claim 1, wherein the power generator includes an electric generator operative to generate electric power by using power obtained from an engine serving as the combustor.

9. The power generation system according to claim 7, further comprising:
   a branch passage branching from the discharged gas passage; and
   a blocker which is disposed on the branch passage and operative to block a flow of the discharged gas, wherein:
   the CO detector is disposed on the branch passage;
   the combustor combusts the hydrogen-containing gas as the fuel;
   the temperature detector detects the temperature of the discharged gas flowing through the branch passage; and
   when the discharged gas is flowing through the discharged gas passage, the control circuitry cancels blocking of the blocker and detects sticking of the blocker based on the detected temperatures detected by the temperature detector after the blocking of the blocker is canceled.

10. The power generation system according to claim 9, wherein when canceling at least the blocking of the blocker, the control circuitry activates the heater disposed on the branch passage and located upstream of the temperature detector.

11. The power generation system according to claim 1, wherein when the structural abnormality of the discharged gas passage is detected, the control circuitry causes an informer to inform of the structural abnormality of the discharged gas passage.

12. A method of operating a power generation system, the method comprising:

combusting a fuel by a combustor;

utilizing energy obtained by the combustor to generate electric power by a power generator; and when a discharged gas is flowing from the combustor through a discharged gas passage, performing at least one of:

an operation of detecting a structural abnormality of the discharged gas passage based on a difference between detected temperatures of a temperature detector relative to a difference between heated amounts of the discharged gas heated by a heater, and an operation of detecting the structural abnormality of the discharged gas passage based on the difference between the detected temperatures of the temperature detector relative to a difference between outputs of at least one of a fuel supplier and an air supplier.

13. The power generation system according to claim 1, wherein the structural abnormality of the discharged gas passage includes break of the discharged gas passage.

14. The power generation system according to claim 1, wherein the structural abnormality of the discharged gas passage includes come-off of the discharged gas passage.

15. The power generation system according to claim 1, wherein the structural abnormality of the discharged gas passage includes clogging of the discharged gas passage.

16. The power generation system according to claim 1, wherein the discharged gas passage is a flow passage in which combustion of the fuel is not performed and the temperature detector is provided on the discharged gas passage or a branch passage of the discharged gas passage.

* * * * *